United States Patent [19]

Inoue et al.

[11] Patent Number: 4,601,216
[45] Date of Patent: Jul. 22, 1986

[54] REDUCTION GEAR

[75] Inventors: Toshitsugu Inoue, Kyoto; Hiromasa Ishihara, Hirakata; Masato Morimoto, Shijyonawate, all of Japan

[73] Assignee: Matsushita Electric Industrial Co., Ltd., Osaka, Japan

[21] Appl. No.: 584,437
[22] PCT Filed: Jun. 18, 1982
[86] PCT No.: PCT/JP82/00236
§ 371 Date: Feb. 16, 1984
§ 102(e) Date: Feb. 16, 1984
[87] PCT Pub. No.: WO84/00056
PCT Pub. Date: Jan. 5, 1984

[51] Int. Cl.$^4$ ............................ F16H 35/00; F16H 1/28
[52] U.S. Cl. ............................................. 74/640; 74/805
[58] Field of Search ................. 74/409, 640, 804, 438, 74/410, 805

[56] References Cited

U.S. PATENT DOCUMENTS

| 2,959,065 | 11/1960 | Musser | 74/438 |
| 3,373,625 | 3/1968 | Keller | 74/409 |
| 3,496,782 | 2/1970 | Carlson et al. | 74/640 X |
| 3,555,929 | 1/1971 | Hossfeld | 74/640 |
| 3,622,092 | 11/1971 | Jagos | 242/4 |

FOREIGN PATENT DOCUMENTS

| 2725557 | 12/1978 | Fed. Rep. of Germany | 74/640 |
| 4529928 | 11/1967 | Japan. | |
| 47-14502 | 5/1972 | Japan. | |
| 55-153308 | 11/1980 | Japan. | |
| 56-85811 | 7/1981 | Japan. | |
| 56-148812 | 11/1981 | Japan. | |
| 813048 | 3/1981 | U.S.S.R. | 74/640 |
| 842305 | 7/1981 | U.S.S.R. | 74/640 |
| 996770 | 2/1983 | U.S.S.R. | 74/640 |

Primary Examiner—Allan D. Herrmann
Assistant Examiner—Joseph M. Rolnicki
Attorney, Agent, or Firm—Wenderoth, Lind & Ponack

[57] ABSTRACT

A reduction gear equipped with a wave generator nearly elliptical in shape, two circular splines with differing numbers of internal teeth, a flex spline which partially meshes with the internal teeth of each of the circular splines and which is deformable in the radial direction and a bearing deformable in the radial direction, which, placed between the wave generator and the flex spline, renders both members relatively slidable, with notches which permit partial deformation of the bearing (6) or the flex spline provided in the wave generator or circular splines at positions corresponding to the balls of the aforementioned bearing, whereby backlash is eliminated and its positive operation is assured.

5 Claims, 7 Drawing Figures

REDUCTION GEAR

TECHNICAL FIELD

The present invention relates to a reduction gear for use in various types of automatic machine and has as its objective providing a reduction gear which permits manufacturing or assembling without especially requiring high working accuracy of parts and which involves slight backlash arising from meshing of teeth.

BACKGROUND ART

Of late, reduction gears which work by taking advantage of the difference in the number of teeth have been put into practical use. First, the outline of this reduction gear has been described with reference to FIG. 1. Numeral 1 designates a wave generator on the periphery of which a roller group 2 is arranged. Further, a flex spline 3 is arranged in the form to circumscribe this roller group 2. This flex spline 3 has teeth ($Z_1$ in numbered) formed on the circumference thereof. This flex spline 3 meshes with the inside teeth ($Z_2$ in number) of the circular spline 4 arranged at the outermost periphery. The relation between $Z_1$ and $Z_2$ is $Z_1 < Z_2$ or $Z_1 > Z_2$, with the difference between the numbers of teeth $Z_1$ and $Z_2$ being an even number. The outside circumference of the flex spline 3 and the inside circumference of the circular spline 4 mesh with each other at two positions on their circumferences. Now, as the wave generator 1 makes one turn, the relative positions of the circular spline 4 and the flex spline 3 are shifted by an angle corresponding to the number of teeth of $(Z_2-Z_1)/2$. A reduction gear of this composition needs to have its flex spline 3 and circular spline 4 formed in elliptical shapes, thus involving difficulties in its manfacturing process and in ensuring the accuracy with which they are formed. Thus, because of the difficulty achieving accuracy informing parts, there was a need of selecting acceptable products only when these parts are to be assembled, which led to high cost.

Then, in order to make this principle realizable, generally, a bearing which is deformable in the radial direction is employed (FIG. 2). Thus, numeral 5 designates a wave generator, on the outside circumference of which a bearing 6 is used, said bearing being so arranged that its inside diameter is lightly pressured in over wave generator 5. This bearing 6 consists of inner ring 6a, outer ring 6b, balls 6c and retainer 6d, and is deformable in the radial direction. On the outside circumference of the aforementioned bearing 6, there is arranged a flex spline 7 and on the outside circumference of this flex spline 7, teeth ($Z_1$ in number) are formed. Further, on the outside circumference of the flex spline 7, circular splines 8 and 9 are located and the internal teeth ($Z_2$ in number) of the circular spline 8 and likewise the internal teeth ($Z_3$ in number) of the circular spline 9 mesh with the external teeth of the flex spine 7. The relationships between the numbers of teeth $Z_1$, $Z_2$ and $Z_3$ are such that $Z_1 < Z_2$, $Z_1 = Z_3$ and the difference in the numbers of teeth $Z_1-Z_2$ is an even number. In this reduction gear, an elliptical shape is obtainable by deforming the bearing 6; therefore, the problem of achieving high accuracy in forming the contacting surfaces of balls may be solved. However, no improvement is apparent in the requirement that the meshing of the teeth of the flex spline 7 and those of the circular splines 8 and 9 must be made without a gap. In manufacturing or assembling this reduction gear, it is necessary to eliminate the variation in the axial thickness of the bearing 6, also to make zero the variation in the radial distance between the internal diameter of the flex spline 7 and its outer circumferential meshing pitch circle A (FIG. 3) and, further, to ensure perfect out of roundness of the meshing pitch circle B of the internal teeth of the circular splines 8 and 9 (FIG. 4).

Such arrangements are virtually impossible to achieve in manufacture, however, and even if proper combinations have been worked out, dimensional errors cannot be compensated for anywhere; consequently, a problem of stoppage of wave generator 5 will arise. Then, if the dimensions of parts have been set with the dimensional errors taken into account in order to avoid this, naturally, backlash will develop, rendering it unusable as a reduction gear for precision devices such as industrial robots, etc.

BRIEF SUMMARY OF THE INVENTION

The present invention provides a reduction gear having a wave generator nearly elliptical in shape, two circular splines formed with internal teeth differing in number, a flex spline which partially meshes with each internal tooth of the aforementioned circular splines and which is deformable in the radial direction, and a bearing which is deformable in the radial direction and which is located between the aforementioned wave generator and flex spline, makes both members relatively slidable, with notches which permit partial deformation of the bearing or the flex spline being formed in the aforementioned wave generator or circular splines at positions corresponding to the balls of the aforementioned bearing, whereby backlash is eliminated and positive operation is assured.

DETAILED DESCRIPTION OF THE PREFERRED EMBODIMENTS

Figure 1:
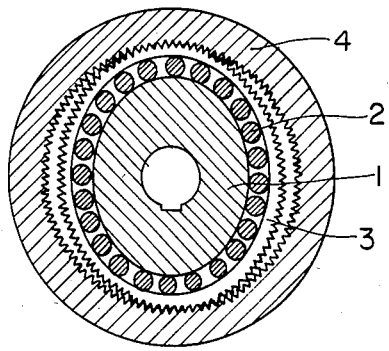
FIG. 1 is a view for explanation of the principle of a reduction gear.
Figure 2:
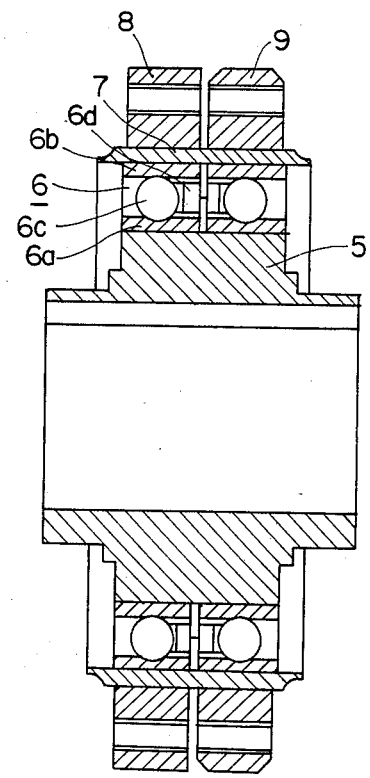
FIG. 2 is a sectional view of a conventional reduction gear.
Figure 3:
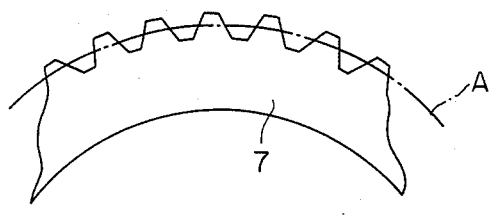
FIG. 3 is a side view of the essential part of the flex spline of this reduction gear.
Figure 4:
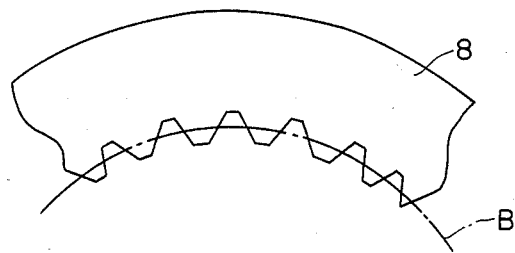
FIG. 4 is a side view of the essential part of the circular spline.

In explaining this embodiment, descriptions of the composition of parts identified by numerals 5-9, which are similar to those of the conventional ones shown in FIG. 2, are omitted.

Figure 5:
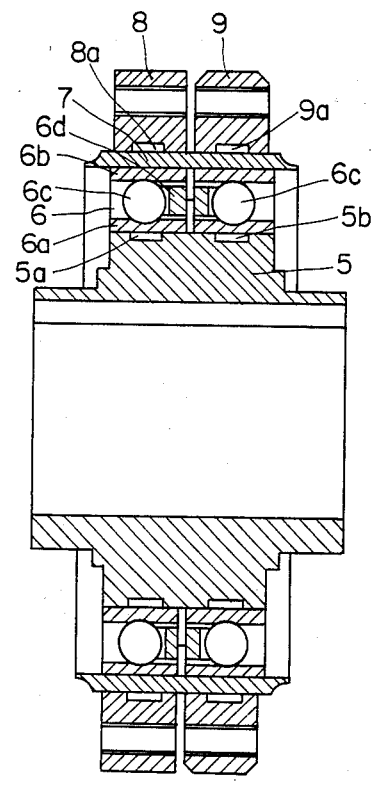
FIG. 5 is a sectional view of a reduction gear embodying this invention.

The characteristic feature of this invention lies in that, referring to FIG. 5, relieving recesses for absorbing dimensional errors in the radial direction are formed in parts facing and being in contact with the inner ring 6a and the outer ring 6b of the deformable bearing 6. Thus, reference numeral 5a and 5b designate ring shape grooves provided in the outer circumference of the wave generator 5 which are in contact with the inner ring 6a of the bearing 6 and at positions corresponding to balls 6c, and reference numerals 8a and 9a designate similarly parts of each inner teeth of the circular splines 8 and 9 which mesh with the flex spline 7 and which are ring shape grooves located at positions corresponding to the balls 6c.

Even though there are some variations in the axial thicknesses of the bearing 6 and the wave generator 5 and there are some variations in the out of roundness of the circular splines 8 and 9 in the aforementioned composition, the aforementioned variations may be compensated for by 5a, 5b, 8a and 9a since due to their deformability, the elements of bearing 6 and flex spline 7 are deformable into the grooves. Accordingly, even if no clearance exists in the assembly of parts, the wave generator 5 will turn, allowing firm meshing between the circular splines 8 and 9 and the flex spline 7, and consequently, meshing gaps between the pairs of teeth are eliminated, theeby enabling correct speed reduction.

Figure 6:
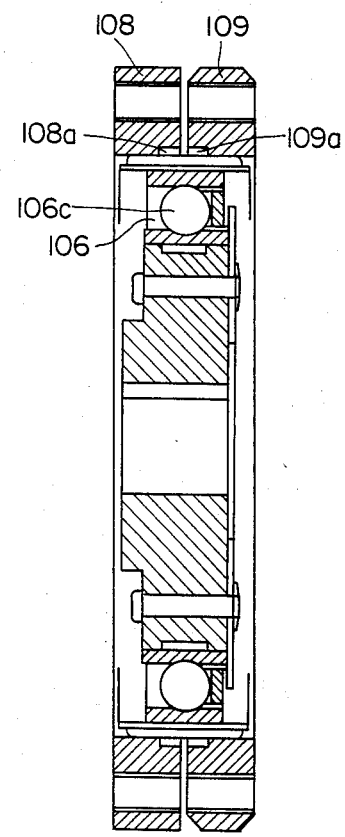
FIG. 6 is a sectional view of another embodiment.

FIG. 6 shows another embodiment of this invention, in which one bearing 106 is used and on the circular splines 108 and 109, grooves 108a and 109a are formed at a position corresponding to a ball 106c.

Figure 7:
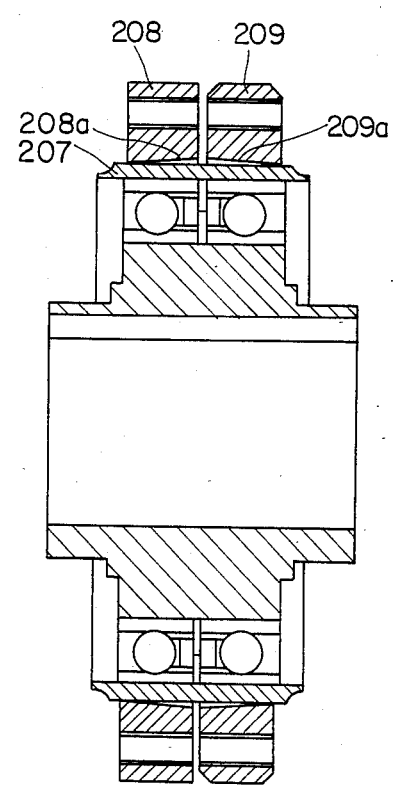
FIG. 7 is a sectional view of still another embodiment.

FIG. 7 gives still another embodiment, in which differing from the composition in the previous embodiment of grooves formed in the inner circumferences of the circular splines at a position corresponding to the ball, tapered notches 208a and 209a are cut into the internal teeth of circular splines 208 and 209 tapered in; the rotational axis direction in the internal teeth of the circular splines 208 and 209, which tapered notches are arranged in such a way that the pitch circle diameters of the circular splines 208 and 209 are increasingly larger toward the side where they face each other.

In this embodiment also, any error in the radial direction dimension may be absorbed by the clearance formed between the external teeth of the flex spline 207 and each internal teeth of the circular splines 208 and 209. Because the internal circumferences of the circular splines 208 and 209 are tapered, their fitting-in is easy when assembling the reduction gear. Moreover, in forming such parts, no separate process such as fluting is required; the working is possible merely by inclining the rotational central axis of the tool by a specified angle.

INDUSTRIAL APPLICABILITY

As described in the foregoing, since notches for absorbing dimensional errors of parts are formed on the outer circumference of the wave generator or on the inner circumferences of the circular splines, even if respective parts are close-fitted together without clearance, inner and outer rings of the bearing with small thicknesses or the flex spline, when deformed, will be brought into the aforementioned notches, thereby compensating for any possible dimensional errors. In this way, a reduction gear involving no backlash may be realized with a simple structure, which will exhibit outstanding enormous effects in practical applications.

What is claimed is:

1. A reduction gear comprising a first circular spline having a central axis of rotation and including first internal teeth having a true circular pitch circle, a second circular spline coaxial with and axially adjacent to said first circular spline and including second internal teeth having a true circular pitch circle, the number of said second internal teeth differing by an even number from the number of said first internal teeth, a flex spline having external teeth which partially mesh with a each internal tooth of said first and second circular splines at positions symmetrical to said central axis of rotation and which is radially deformable, a wave generator having a nearly elliptical cross section, inside said flex spline and coaxial with said first and second circular splines, and a bearing, including an inner ring in contact with the external circumference of said wave generator, an outer ring and balls placed therebetween, said bearing being disposed between the internal circumference of said flex spline and the external circumference of said wave generator and being radially deformable, said flex spline being rotatable on said outer ring relative to said first and second circular splines, said inner ring and said balls, said wave generator having a ring shape notch in the peripheral surface thereof, said notch being axially aligned with said balls of said bearing such that said inner ring is radially deformable into said notch.

2. A reduction gear according to claim 1 wherein said notch is a groove having a width smaller than the width of said inner ring of said bearing.

3. A reduction gear, comprising a first circular spline having a central axis of rotation and including first internal teeth having a true circular pitch circle, a second circular spline coaxial with and axially adjacent to said first circular spline and including second internal teeth having a true circular pitch circle, the number of said second internal teeth differing by an even number from the number of said first internal teeth, a flex spline having outer teeth which partially mesh with each internal tooth of said first and second circular splines at positions symmetrical to said central axis of rotation, a wave generator inside said flex spline and coaxial with said first and second circular splines, and a bearing including an inner ring, an outer ring and balls therebetween, said bearing being disposed between and in contact with the internal circumference of said flex spline and the external circumference of said wave generator and being radially deformable, said first and second internal teeth having a ring-shaped notch formed therein aligned with said balls of said bearing, such that said flex spline and bearing are radially deformable into said notch.

4. A reduction gear according to claim 3, wherein said notch is a groove having a width smaller than that of the width of said outer ring of said bearing.

5. A reduction gear comprising a first circular spline having a central axis of rotation and including first internal teeth having a true circular pitch circle; a second circular spline coaxial with and axially adjacent to said first circular spline and including second internal teeth having a true circular pitch circle, the number of said second internal teeth differing by an even number from the number of said first internal teeth; a flex spline having outer teeth which partially mesh with each internal tooth of said first and second circular splines at positions symmetrical to said central axis of rotation; a wave generator inside said flex spline and coaxial with said first and second circular splines, and a bearing including an inner ring, an outer ring, and balls therebetween, said bearing being disposed between the internal circumference of said flex spline and the external circumference of said wave generator and being radially deformable, said first internal teeth being tapered radially outwardly and toward said second circular spline, said second internal teeth being tapered radially outward and toward said first circular spline, the taper in said first and second internal teeth defining a ring shape notch into which said flex spline and said bearing are radially deformable.

* * * * *